(12) United States Patent
Fan et al.

(10) Patent No.: US 6,309,996 B1
(45) Date of Patent: Oct. 30, 2001

(54) SUSPENSION CARBONATION PROCESS FOR REACTIVATION OF PARTIALLY UTILIZED SORBENT

(75) Inventors: Liang Shih Fan; Rajeev Agnihotri; Suhas K. Mahuli, all of Columbus, OH (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 09/073,237

(22) Filed: May 7, 1998

(51) Int. Cl.$^7$ .............................. B01J 20/34; B01J 20/00
(52) U.S. Cl. ........................... 502/24; 502/34; 502/400
(58) Field of Search ....................... 502/400, 22, 34, 502/24; 423/244.07, 244.08, 430, 431, 432, 635, 636, 637, 638, 639, 640

(56) References Cited

U.S. PATENT DOCUMENTS

| | | | |
|---|---|---|---|
| 4,081,522 | * 3/1978 | Hubble et al. | 423/170 |
| 4,226,839 | * 10/1980 | O'Neill et al. | 423/177 |
| 4,312,280 | * 1/1982 | Shearer et al. | 110/347 |
| 4,442,078 | * 4/1984 | Jalan et al. | 423/230 |
| 4,533,532 | 8/1985 | Gebhard et al. . | |
| 4,613,487 | * 9/1986 | Yoon et al. | 423/244.08 |
| 4,729,889 | 3/1988 | Flytani-Stephanopoulos et al. . | |
| 4,950,409 | 8/1990 | Stanforth | 210/751 |
| 5,160,715 | 11/1992 | Pinnavaia et al. . | |
| 5,275,739 | 1/1994 | Grant et al. | 210/682 |
| 5,585,081 | * 12/1996 | Chu et al. | 423/239.1 |
| 5,779,464 | 7/1998 | Fan et al. . | |

OTHER PUBLICATIONS

Agnihotri et al., *Sorbent/ Ash Reactivation for Enhanced SO$_2$ Capture Using a Novel Carbonation Technique*, Ind. Eng. Chem. Res. 38:812–819 (01/05/99).

Al–Shawabkeh et al., *Enhanced SO$_3$Abatement with Water–Hydrated Dolomitic Particles*, AIChE Journal, Vol. 43, No. 1 (Jan., 1997).

Couturier et al., *Reactivation of Partially–Sulphated Limestone Particles from a CFB Combustor by Hydration*, The Canadian Journal of Chemical Engineering, Vol. 72 (Feb., 1994).

Ghosh–Dastidar et al., *Investigation of High–Reactivity Calcium Carbonate Sorbent for Enhanced SO$_2$ Capture*, American Chemical Society, (1996).

Gullett et al., *Pore Distribution Changes of Calcium–Based Sorbents Reacting with Sulfur Dioxide*, AIChE Journal, vol. 33, No. 10 (Oct. 1987).

Jozewicz et al., *Fly Ash Recycle in Dry Scrubbing*, Environmental Progress, vol. 5, No. 4 (Nov., 1986).

Jozewicz et al., *Reactivation of Solids from Furnace Injections of Limestone for SO$_2$Control*, Environ. Sci. Technol., vol.21, No. 7 (1987).

Khan et al., *Improving Limestone Utilization in Circulating Fluidized Bed Combustors Through the Reactivation and Recycle of Partially Utilized Limestone in the Ash*, Fluidized Bed Combustion vol. 2 ASME (1995).

Mahuli et al., *Pore–Structure Optimization of Calcium Carbonate for Enhanced Sulfation*, AIChE Journal, vol. 43 No. 9 (Sep. 1997).

Martinez et al., *Reactivztion of Fly Ash and Ca(OH)$_2$Mixtures for SO$_2$ Removal of Flue Gas*,Ind. Eng. Chem. Res., 30:2143–2147 (1991).

Tsuchiai et al., *Highly Active Absorbent for SO$_2$Removal Prepared from Coal Fly Ash*, Ind. Eng. Chem. Res., 34:1404–1411 (1995).

Wei et al., *High Surface Area Calcium Carbonate: Pore Structural Properties and Sulfation Characteristics*, American Chemical Society, (1997).

Shearer et al., *Hydration Enhanced Sulfation of Limestone and Dolomite in the Fluidized–Bed Combustion of Coal*, Journal of the Air Pollution Control Association, (1980).

Marquis, *Reactivation of Spent CFB Limestone by Hydration*, Thesis for the University of New Brunswick, (Sep., 1992).

Milne et al., *High–Temperature, Short–Time Sulfation of Calcium–Based Sorbents, Ind. Eng. Chem. Res.*, vol. 29 No. 11, pp. 2201–2214 (1990).

Borgwardt, Sintering of Nascent Calcium Oxide, *Chemical Engineering Science*, vol. 44, No. 1, pp. 53–60 (1989).

Bortz and Flament, Recent IFRF Fundmental and Pilot Scale Studies on the Direct Sorbent Injection Process, *International Flame Research Foundation*, pp. 17–1–17–22 (1985).

(List continued on next page.)

Primary Examiner—Steven Bos
(74) Attorney, Agent, or Firm—Standley & Gilcrest LLP

(57) ABSTRACT

A novel process has been developed for reactivation of partially utilized calcium-based sorbents for increased SO$_2$ removal and sorbent utilization from coal-fired boilers/combustors. Spent sorbent and combustor ash samples are treated under specific conditions to modify their internal structure and expose the under utilized calcium for further SO$_2$ capture. The reactivated sorbent shows significant improvement in utilization, increasing from less than 45% to nearly 100% utilization. Application of novel reactivation process to ash samples obtained from a circulating fluidized bed combustor also show marked improvement in utilization of available calcium, nearly doubling the amount of sulfur captured. The reactivation process involves carbonation of the unsulfated calcium. Better redistribution and exposure of the available calcium by the carbonation reactivation process, as compared to reactivation via hydration, is proposed as the main factor in increasing the sorbent utilization. The increased ultimate sorbent utilization obtained by this reactivation process could significantly improve the sorbent-based flue gas desulfurization technology.

19 Claims, 11 Drawing Sheets

OTHER PUBLICATIONS

Kirchgessner, D.A., & Jozewicz, W., Enhancement of Reactivity in Surfactant–Modified Sorbents for Sulfurdioxide Control, *Ind. Eng. Chem. Res.*, 28(4), pp. 413–418(1989).

Raghunathan et al. Raghunathan K., A. Ghosh–Dastidar, and L.–S. Fan, A Technique for the Study of Ultrafast Gas–Solid Reactions for Residence Times less than 100 ms, *Rev. Sci. Instrum.*, 63(11), 5469 (1992).

Ghosh–Dastidar, et al. Ghosh–Dastidar, A., Mahuli, S., Agnihotri, R., and Fan, L.–S., Ultrafast Calcination and Sintering of Ca(OH)2 powder: Experimental & Modeling, *Chem. Eng. Sci.*, vol. 50, No. 13, pp. 2029–2040, (1995).

Kirchgessner, Lorrain, Lignosulfonate–Modified Calcium Hydroxide for Sulfur Dioxide Control,m *Ind. Eng. Chem. Res.*, 1987, 26, pp. 2397–2400.

B.K. Gullett, K.R. Bruce, Pore Distribution Changes of Calcium–Based Sorbents Reacting with Sulfur Dioxide, *AICh Journal*, Oct. 1987, vol. 33, No. 10, pp. 1719–1726.

A. Ghosh–Dastidar, S. Mahuli, R. Agnitiotri and L.–S. Fan, Selenium Capture Using Sorbent Powders: Mechanisms of Sorption of Hydrated Lime. Sep. 11, 1995.

* cited by examiner

SUSPENSION CARBONATION PROCESS FOR REACTIVATION OF PARTIALLY UTILIZED SORBENT

BACKGROUND OF THE INVENTION

Limestone ($CaCO_3$) or hydrated lime ($Ca(OH)_2$) used in pulverized or fluidized bed combustors for $SO_2$ removal suffer from low reactivity and under utilization. In spite of being economical and easily retrofittable in the existing utility units, dry sorbent processes fail to be more competitive with other more expensive $SO_2$ control technologies due to their poor $SO_2$ removal efficiency and low sorbent utilization. Typically, less than 50% of the available calcium is converted to high molar volume calcium sulfate product which causes pore blocking and pore mouth plugging and renders the sorbent ineffective for any further $SO_2$ capture. The spent sorbent from pulverized combustors (PC's) exhibits less than 35% calcium utilization, while for circulating fluidized bed combustors (CFB's), up to 45% calcium utilization is realized (Couturier et al., 1994).

The spent sorbent exhibits negligible reactivity towards $SO_2$ and in order to increase the sorbent utilization, the sorbent needs to be reactivated to expose the unreacted CaO. Reactivation of the under utilized sorbent would necessarily require, re-exposing and/or redistribution of the CaO from the interior of the sorbent particle and reactivation of the sintered CaO by converting it into a more reactive form. The fundamental challenge and goal of the reactivation process is to redistribute the $CaSO_4$ predominantly from the surface of the particle to a more uniform distribution.

One of the methods for reactivating partially utilized sorbents is by the process of hydration (Bobman et al., 1985). In this process, the unsulfated CaO is reacted with water to form $Ca(OH)_2$. Due to higher molar volume of the hydroxide (33 cc/gmol), compared to CaO (17 cc/gmol), the sorbent particles expands and the non-porous $CaSO_4$ shell cracks thereby exposing the hydrate. Moreover, once this reactivated sorbent is reintroduced into the combustor, calcination of $Ca(OH)_2$ further increases the porosity and provides added exposure of CaO to $SO_2$. Hydration has been known to increase the utilization of spent sorbent from 35% to up to 70% (Couturier et al., 1994). It is known that the effectiveness of the hydration reactivation process is dictated by the duration of hydration, the hydration temperature, and the solids concentration in the process. The temperature for drying the hydration products has also been indicated to markedly affect the activity of the reactivated product (Khan et al., 1995; Tsuchia et al., 1995).

Researchers (Al-Shawabkeh et al., 1997) have studied the slurry-based hydration (3% solids concentration) of calcined dolomitic particles to produce an effective sorbent for $SO_2$ removal. They observed a 1.3–1.6 fold increase in $SO_2$ capture ability at 900° C. in a thermo-gravimetric setup. In their study, increasing hydration time and temperature had a favorable effect on the hydration activation. Several researchers have reported that a recycle of spent sorbent and fly ash mixture into the spray dryer results in substantial improvements in reagent utilization and $SO_2$ removal (Melia et al., 1983; Palazzolo et al., 1984; Parson et al., 1981). It has been suggested that substantial reactions take place between the fresh $Ca(OH)_2$ and recycled fly ash from spray dryer resulting in the formation of hydrated calcium silicates and their subsequent reaction with $SO_2$ leads to the increased efficiencies. Laboratory experiments conducted with slurried $Ca(OH)_2$ and one of the fly ash components show several folds increase in sorbent utilization (Josewicz and Rochelle, 1986) From these results they concluded that enhanced utilization of the recycle fly ash and calcium solids is probably due to reaction between $Ca(OH)_2$ and fly ash to produce calcium silicates which have greater surface area than unreacted $Ca(OH)_2$ and are more effective for gas-solid reactions. Researchers have also suggested that increased time and temperature of the slurrying process gives more reactive solids.

Characterization and testing of hydrated mixtures of fly ash and $Ca(OH)_2$ under laboratory conditions suggests that hydrated mixtures develop higher total surface area than the arithmetic sum of surface areas of initial solids before hydration (Martinez et al., 1991). These studies also report that the incremental surface area increased with temperature, time of hydration, and fly ash/$Ca(OH)_2$ ratio, with temperature effect being the strongest. Tetracalcium aluminate monosulfate and tetracalcium aluminate are assumed to be responsible for the increased surface areas. Removal efficiencies of up to 65% are reported (Hurst et al. 1981), with a slurry of highly alkaline (20% unutilized CaO) fly ash only.

Josewicz et al. (1987) investigated the reactivation of boiler limestone injected solids via hydration process for enhancing their calcium utilization. They have reported that the activity of sorbents prepared from spent furnace sorbent (containing CaO and $CaSO_4$), and fly ash, is greatly influenced by the hydration reaction. Their studies also report that the activity of spent sorbent increased with the hydration time, which resulted in the formation of ettringite and calcium silicate. Josewicz et al. (1987) have cited that the main factor for enhancement of $SO_2$ capture is the pozzolonic reaction on combining recycled solids and water.

Reactivation of spent limestone samples from circulating fluidized bed combustor via hydration has been found to cause particle expansion with increase in their internal volume (Couturier et al., 1994; Shearer et al., 1980; Marquis, 1992). Couturier et al. (1994) determined that the conversion of available calcium to $CaSO_4$, in the treated/reactivated bed particles increased from 32% to 80%. They suggested that hydration creates new pores and internal volume of the particle. The water permeates through the partially sulfated layer and reacts with the inner CaO core to form calcium hydroxide. The hydroxide having the higher molar volume swells and cracks the partially sulfated shell. Marquis (1992) studied the correlation between the extent of conversion of CaO in fly ash to $Ca(OH)_2$ during hydration and the utilization of Ca upon re-sulfation and observed that with increasing conversion of CaO to $Ca(OH)_2$ the extent of calcium utilization increased upon sulfating the reactivated sorbent.

The above mentioned mechanisms for reactivation of spent sorbent via hydration suggest that big particles (greater than 200 mm, the typical ash particle size obtained from fluidized bed combustors), undergo reactivation by particle expansion and subsequently develop cracks on the outer inactive sulfate shell (Couturier et al., 1994). Reactivation of particles that are of smaller dimension, (such as from the bag-house), might be due to reactions between silica/alumina species and calcium leading to the formation of Ca—Si—Al complexes. These complexes have high surface areas and are highly effective for gas-solid reactions (Josewicz and Rochelle, 1986).

As suggested by several researchers (Ghosh-Dastidar et al., 1996; Mahuli et al., 1997; Gullett and Bruce, 1987), the key to the high reactivity of a sorbent, fresh or partially utilized, lies in its open initial internal structure and subsequent pore structure evolution under high temperature conditions.

Accordingly, there remains a need for a method of efficiently recycling calcium-based sorbents.

It is also an object of the present invention to be able to provide recycled calcium-based sorbents that are able to perform substantially as new sorbents, to prevent waste and thereby achieve more complete usage of calcium-based sorbents.

In addition to the features mentioned above, objects and advantages of the present invention will be readily apparent upon a reading of the following description.

SUMMARY OF THE INVENTION

Figure 1:
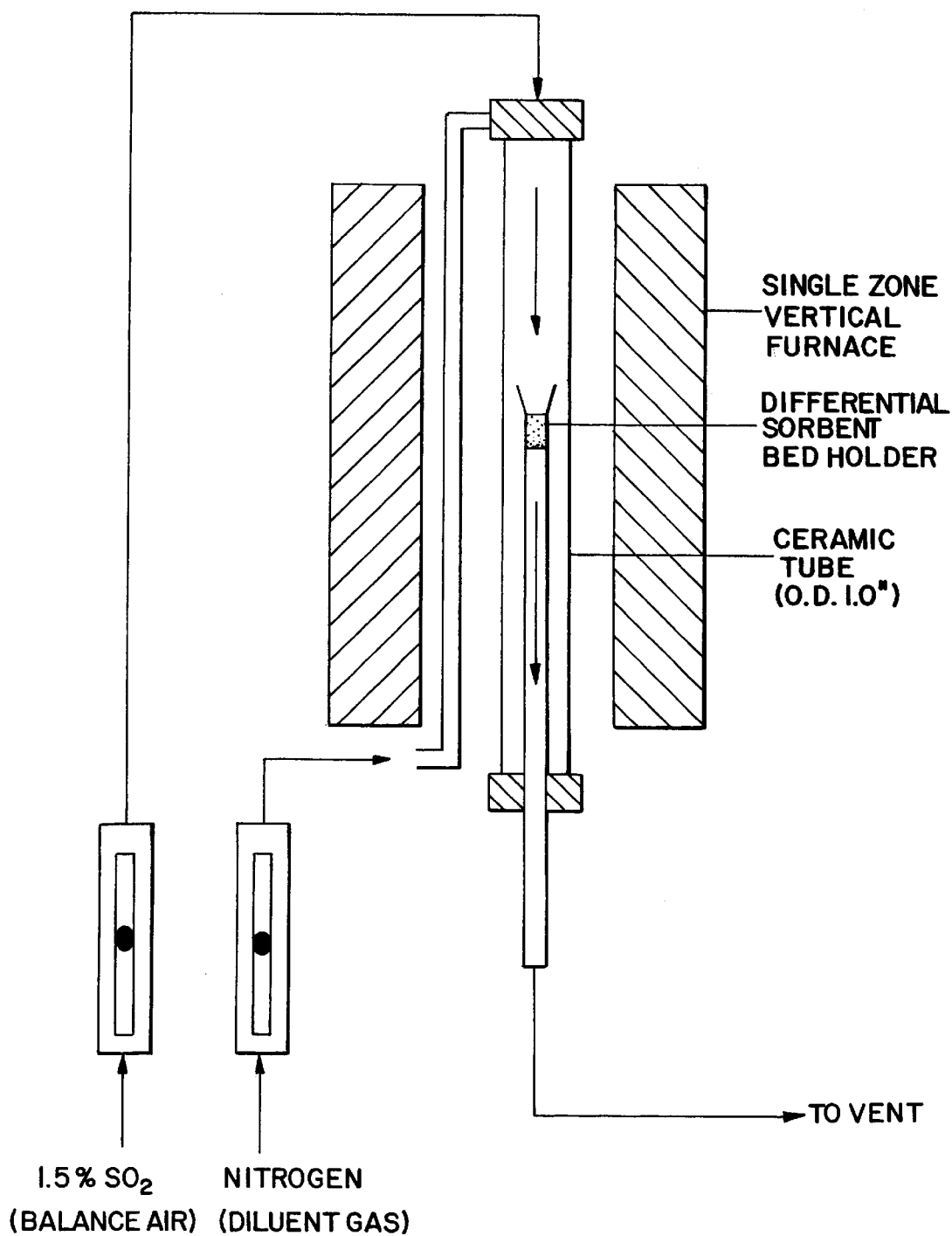
FIG. 1 is a schematic of a differential bed reactor system used to assess the degree of sulfanation in sorbents used in accordance with the present invention.

In accordance with the present invention, there is disclosed a novel reactivation technique is developed from a fundamental understanding of the pore structural properties of both $CaCO_3$ and $Ca(OH)_2$ and the evolution of pore structure with calcination and sintering. Understanding the solubility and precipitation characteristics of various calcium compounds in partially utilized sorbents is essential in developing a process capable of successfully reactivating the under utilized sorbent. This new technique for reactivating the partially utilized sorbent is based on a suspension-based carbonation process which is being patented (Ghosh-Dastidar et al., 1996, Wei et al., 1997, Fan et al., 1995). The process involves converting the unreacted CaO into calcium carbonate ($CaCO_3$) instead of calcium hydroxide ($Ca(OH)_2$). Along with reactivation of unreacted CaO, this process also provides a better distribution/exposure of available calcium (Fan et al., 1997).

The novel carbonation reactivation process is successfully applied to reactivation of two partially utilized sorbents generated in the laboratory, and has been further extended to reactivation of two commercial ash samples, as described below.

In general terms, the method of the present invention includes a method for reactivating a calcium-based chemical sorbent, the method comprising the steps: (a) obtaining a calcium-based sorbent the sorbent having adsorbed thereupon one or more waste stream components (i.e. any waste stream component amenable to adsoption upon the calcium-based sorbent); and (b) subjecting the sorbent to carbonation so as to at least partially reactivate the sorbent. As used herein, reactivation should be understood as meaning providing an exposed surface of the calcium sorbent material not earlier available for use as a sorbent surface. It is believed that the calcium sorbent becomes solvated and redeposited on the surface of the adsorbed waste stream component.

The method of the present invention may be carried out such that the carbonation is carried out in the presence of a substance selected from the group consisting of surfactants, modifiers and dispersants, which may be any appropriate substance from these classes. Examples of such surfactants may include calcium lignosulfate, such as LIGNOSITE® 100, commonly available from Georgia Pacific. Examples of such modifiers may include sodium chloride (NaCl), calcium chloride ($CaCl_2$), and sodium carbonate ($Na_2CO_3$). Examples of such dispersants may include DISPEX N40V (CAS REGISTRY number 204529-07-7) and DISPEX A40 (CAS REGISTRY number 9003-03-6), commonly available from Allied Colloids. Typical concentrations of such surfactants, modifiers and/or dispersants are each in the range of about 1–1.5% by weight.

The method of the present invention may be carried out on any calcium-based sorbent, such as those selected from the group consisting of calcium carbonate sorbents and calcium hydrate sorbents.

The method of the present invention may be carried out by conducting the carbonation in an aqueous solution, such as in a bubbling reactor. In such cases, it is preferred that the concentration of carbonation in the aqueous solution is in the range of from about 2 to about 16 percent.

The waste stream-derived components deposited upon the calcium sorbent may be any adsorbed substance, such as waste stream-derived components comprising calcium sulfate, calcium chlorides, etc., which are derived from the interaction of the sorbent with a waste stream, such as flue gases.

The present invention also includes a reactivated calcium-based sorbent prepared in accordance with the method of the present invention in any of its embodiments.

The present invention also includes a reactivated calcium-based chemical sorbent, the reactivated chemical sorbent arising from a partially used chemical sorbent having a waste stream component adsorbed thereupon, the reactivated sorbent comprising particles comprising: (a) an interior portion comprising the waste stream component originally adsorbed on to the partially used sorbent; (b) an exterior portion comprising a calcium-based chemical sorbent material. The reactivated sorbent may be formed from calcium-based chemical sorbent materials comprising a calcium-based chemical sorbent material selected from the group consisting of calcium carbonates and calcium hydrates. The waste stream component may comprise calcium sulfate.

Novel features and advantages of the present invention, in addition to those mentioned above, will become apparent to those skilled in the art from a reading of the following detailed description.

DETAIL DESCRIPTION OF PREFERRED EMBODIMENT(S)

The preferred system herein described is not intended to be exhaustive or to limit the invention to the precise forms disclosed. They are chosen and described to explain the principles of the invention, and the application of the method to practical uses, so that others skilled in the art may practice the invention.

EXAMPLES

Partially Utilized Sorbents and Ashes: Production and Characterization

The partially utilized sorbents were generated by sulfating commercial $CaCO_3$ (LC) and $Ca(OH)_2$ (LH) obtained from Linwood Minerals and Mining Co. This initial production cycle, called the first cycle of sulfation, was carried out in a differential fixed-bed reactor assembly shown in FIG. 1. The sulfation reactor is a 2.54 cm OD ceramic tube housed in a single zone vertical furnace (Thermcraft). The reactor accommodates a custom-designed 1.27 cm OD sorbent bed holder. A small amount of sorbent (~20 mg) is dispersed on quartz wool placed in the sorbent bed holder. Differential conditions were maintained by using a high reactant gas flow rate of 1.6 slpm which corresponds to a velocity of about 15 cm/s through the sorbent bed, ensuring minimal external transport resistances. Prior to sulfation, the sorbent was calcined in situ by subjecting it to a calcination temperature of 900° C. under inert nitrogen flow for 10 minutes. Sulfation was conducted by exposing the calcined sorbent to the reactant gas stream, consisting of 3900 ppmv $SO_2$, 5.5% O2 and balance $N_2$, for 30 minutes at a flow rate of 1.6 slpm and temperature of 900° C.

The ash samples were obtained from Foster Wheeler Development Corporation. The fly ash (FA) and the bottom ash (BA) samples were from the Manitowac CFB unit utilizing petroleum coke. Since the fly ash and bottom ash samples had already undergone at least one cycle of sulfation these were not subjected to the first sulfation cycle as described for the commercial Ca-based sorbents.

The extent of sulfation was analyzed from $SO_4^{2-}$ concentration, using ion chromatography (Alltech). The particle size distributions were measured by Sedigraph 5100 (Micromeritics). The surface area and pore volumes were analyzed by low temperature $N_2$ adsorption using the BET technique (Quantachrome). The X-Ray Diffractograms (XRD) were used to obtain the chemical composition of the sorbent and ash, while Thermo-Gravimetric Analyzer (TGA) was employed to get the distribution of available calcium in the form of oxide, hydroxide or carbonate in various samples. The physical characteristics, such as crystal structure, surface morphology and elemental quantification of calcium and sulfur in the vicinity of the surface, were investigated using Scanning Electron Microscopy (SEM) and Energy Dispersive Spectroscopy (EDS), respectively.

Reactivation of Partially Utilized Sorbent and Ashes

Figure 2:
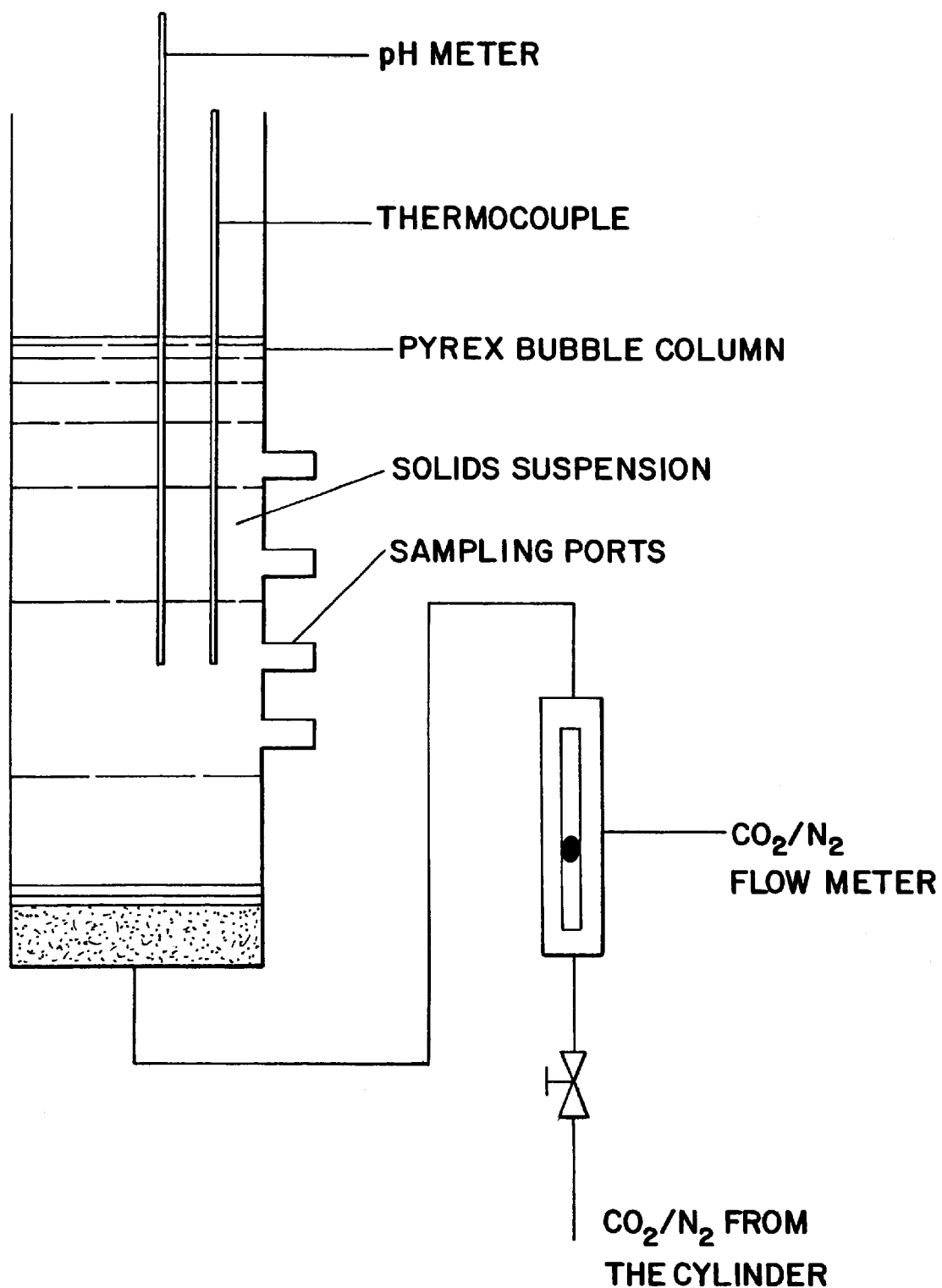
FIG. 2 is a schematic of an apparatus used to reactivate a sorbent in accordance with one embodiment of the present invention.

The partially utilized sorbents generated after the first cycle of sulfation and the as-received FA and BA samples were reactivated in a slurry bubble column reactor. The same reactor system was used for reactivation via hydration and carbonation. The operating conditions are identical for both reactivation processes except pure nitrogen was used for hydration while pure carbon dioxide is used for carbonation. A schematic of the reactor set-up used for reactivation is shown in FIG. 2. The Pyrex reactor is 6.4 cm in diameter and 38 cm in height. A sintered glass plate with a pore opening of 25 to 50 mm (ASTM Por C) was used as the gas distributor. An aqueous suspension with solids concentration of 2.5 wt. % was prepared and reacted batch-wise with either pure $N_2$ or $CO_2$. A small amount of anionic surfactant, LIGNOSITE® 100 (Georgia Pacific), was used in concentration of 2 wt % (based on the weight of calcium hydroxide formed in the slurry). Such ionic surfactant additives are known to act as dispersing agents in aqueous systems leading to reduced agglomeration of crystallites. Dispersant DISPEX N40V produces a stabilizing and dispersing action by ionizing in water to give sodium cations together with a polyanion. These polyanions adsorb irreversibly on the particle surface causing the particle to become negatively charged. Adjacent particles then repel each other to maintain a state of dispersion. The reactivation was conducted for 60 min. using a gas flow rate $(N_2/C)_2)$ of 2.25 slpm. The particles sampled from the slurry bubble column reactor were filtered by #1 filter paper and were dried in a vacuum oven at 110° C. for 24 hours to remove all the surface moisture. The extent of conversion of CaO to $Ca(OH)_2$/ $CaCO_3$ during the reactivation was determined by TGA analyses.

Sulfation of Reactivated Sorbents and Ashes

The reactivated sorbents and ash samples were tested for their $SO_2$ removal ability and sorbent utilization. This subsequent sulfonation, called the second cycle of sulfation, was conducted in the differential bed reactor system. The in-situ calcination and subsequent sulfation were performed under experimental conditions described earlier.

Results and Discussion

"Life-Cycle" Sulfation and Reactivation of Ca-based Sorbents

Figure 3:
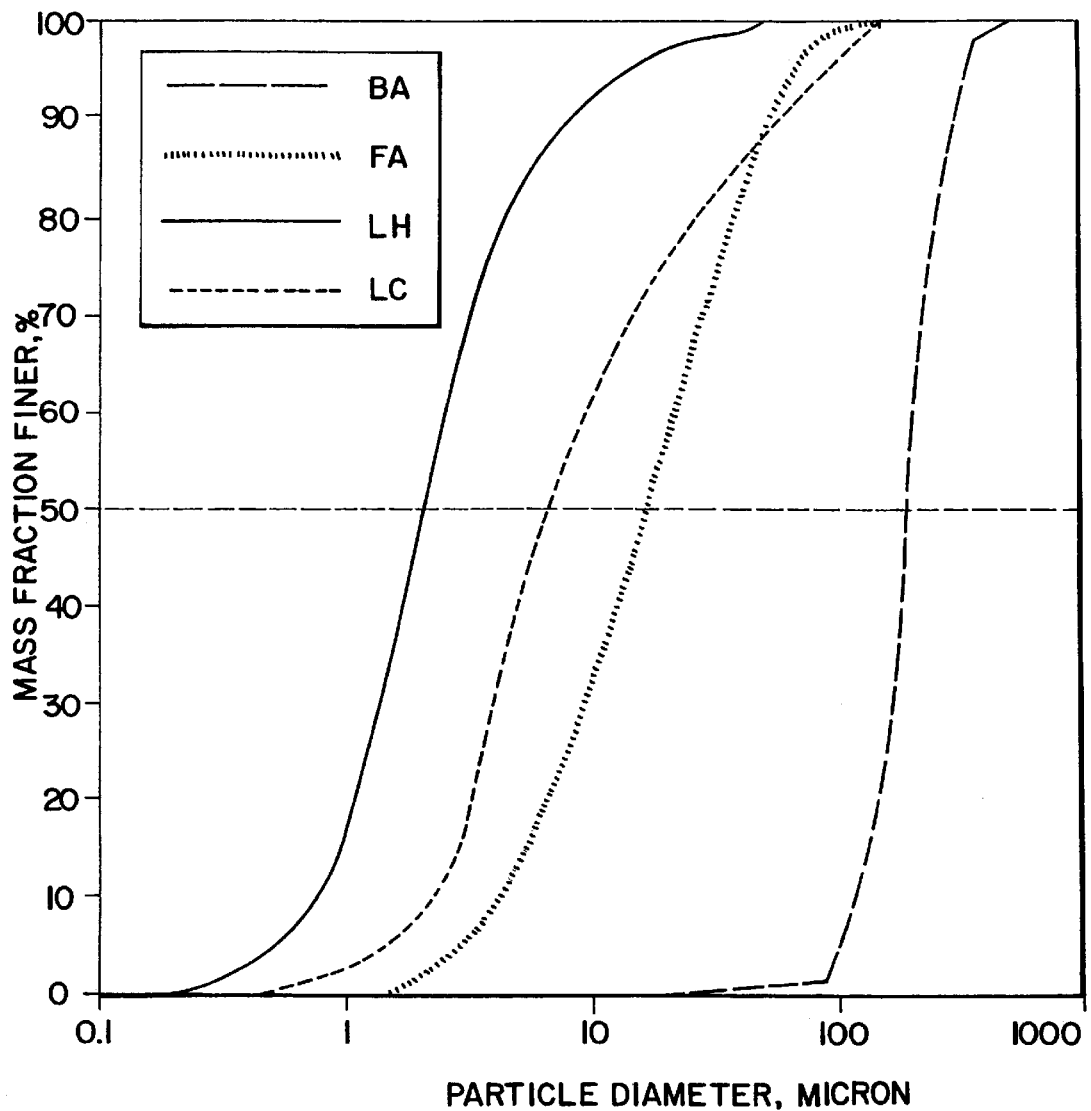
FIG. 3 is a graph of primary particle size distribution for Bottom ash (BA), fly ash (FA), linwood hydroxide (LH) and linwood carbonate (LC).

The commercial sorbents, Linwood $CaCO_3$ and $Ca(OH)_2$, were analyzed to give a surface area of 1.9 and 16.9 m2/g and a pore volume of 0.004 and 0.06 cc/g, respectively. The chemical composition of the sorbents is given in Table 1. FIGS. 3 show the particle size distributions of $CaCO_3$ and $Ca(OH)_2$, which indicate a mass median diameter (d50) of 7 mm for carbonate and 1.2 mm for hydroxide.

Figure 4A:
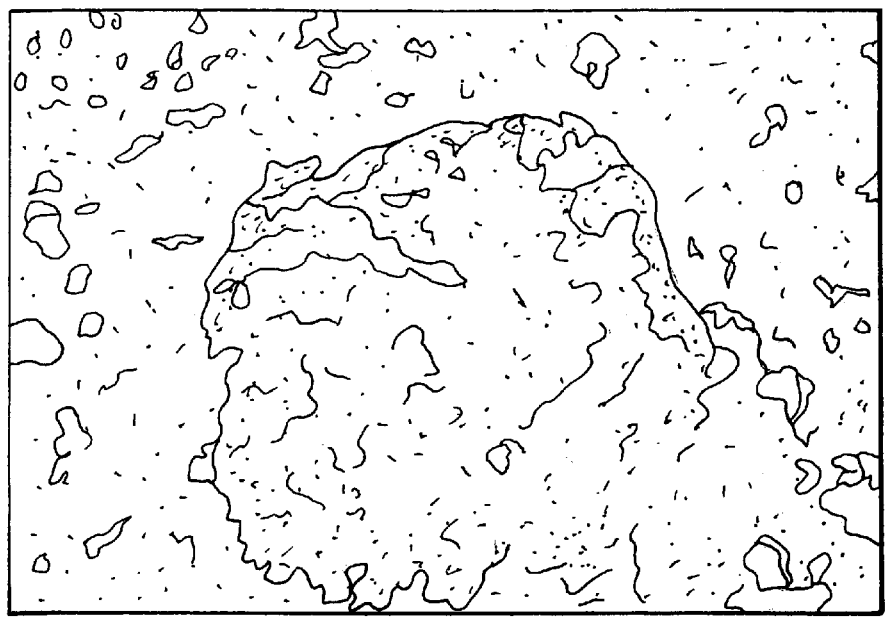
FIG. 4 includes scanning electron micrographs of (a) $Ca(OH)_2$ after a first cycle of sulfanation, and (b) $CaCO_3$ after a first cycle of sulfanation.
Figure 4B:
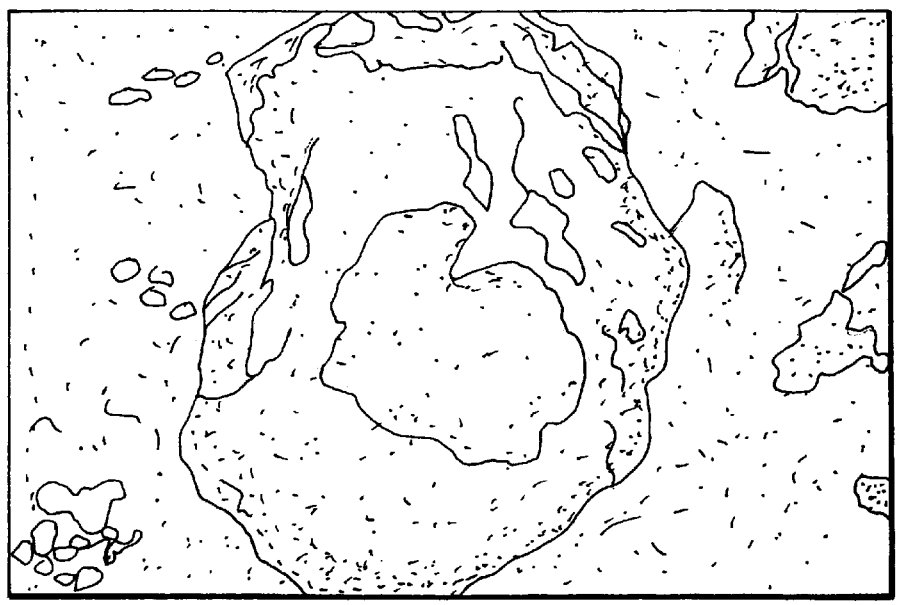

The first cycle of sulfation of pure $CaCO_3$ and $Ca(OH)_2$ shows the ultimate sorbent utilization of 35% for $CaCO_3$, while a sorbent conversion of 51% was obtained for $Ca(OH)_2$ after 30 min. of sulfation at 900° C. The XRD analyses of sulfated samples show the presence of CaSO4 and CaO only, thus confirming that all the available/ unsulfated calcium was in the form of CaO. The SEM pictographs of the samples after first sulfation cycles are illustrated in FIGS. 4. These micrographs indicate a highly sintered non-porous surface structure. This is due to high levels of sintering and the build-up of the high molar volume CaSO4 product layer which, envelops the CaO particle and renders it ineffective in capturing any further $SO_2$. The EDS analyses of the sulfated samples exhibit a calcium to sulfur atomic ratio of about 1.0, for both $Ca(OH)_2$ and $CaCO_3$, in the vicinity of the sorbent particle surface, are summarized in Table 3. This indicates that, near the particle surface, $CaSO_4$ is the predominant species. The surface area and pore volume of the sulfated sorbent samples were found to be negligible.

Figure 5A:
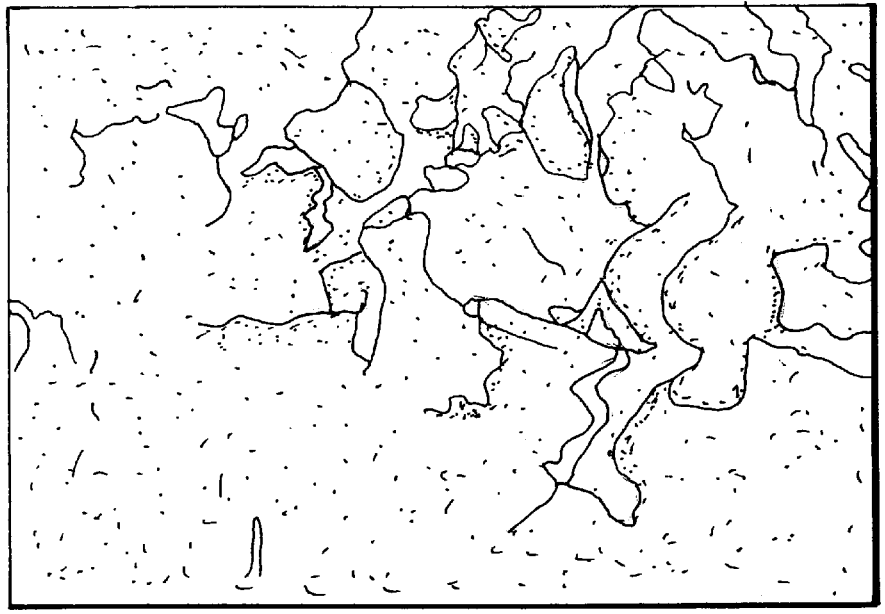
FIG. 5 shows scanning electron micrographs of hydration reactivated (a) partially sulfated calcine from $Ca(OH)_2$, and (b) partially sulfated calcine from $CaCO_3$.
Figure 5B:

The sulfated sorbents were reactivated via both carbonation (using $CO_2$) and hydration (using $N_2$) in the slurry bubble column reactor. The scanning electron micrographs of the hydration reactivated sorbent samples are shown in FIGS. 5. It can be seen that the hydrated spent sorbent samples show development of cracks on the surface due to the formation of high molar volume $Ca(OH)_2$. Hydration process rarely leads to the breakage of the particles and hence, the hydrated sorbent particles show a size distribution similar to the parent spent sorbent.

Figure 6A:
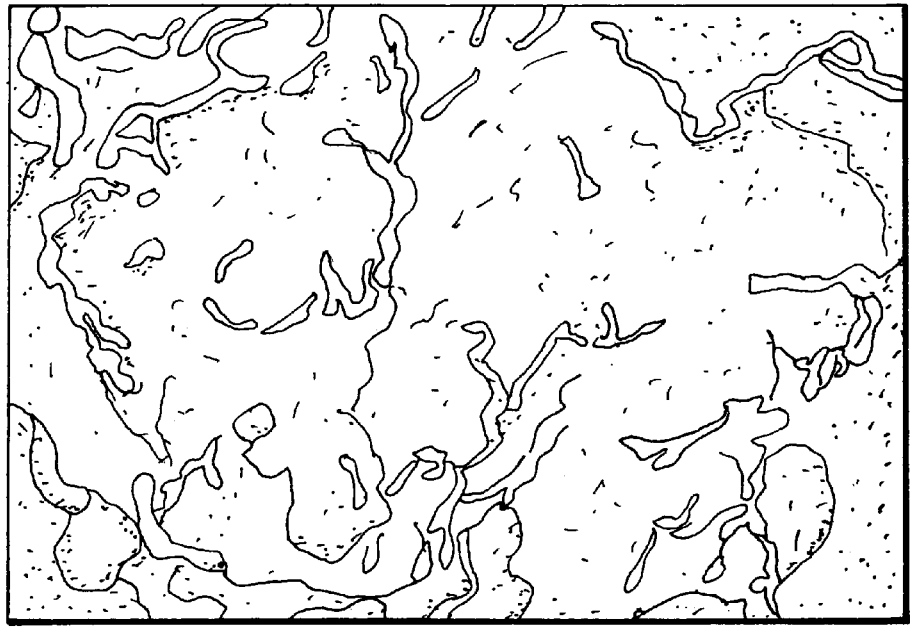
FIG. 6 shows scanning electron micrographs of carbonation reactivated (a) partially sulfated calcine from $Ca(OH)_2$, and (b) partially sulfated calcine from $CaCO_3$.
Figure 6B:
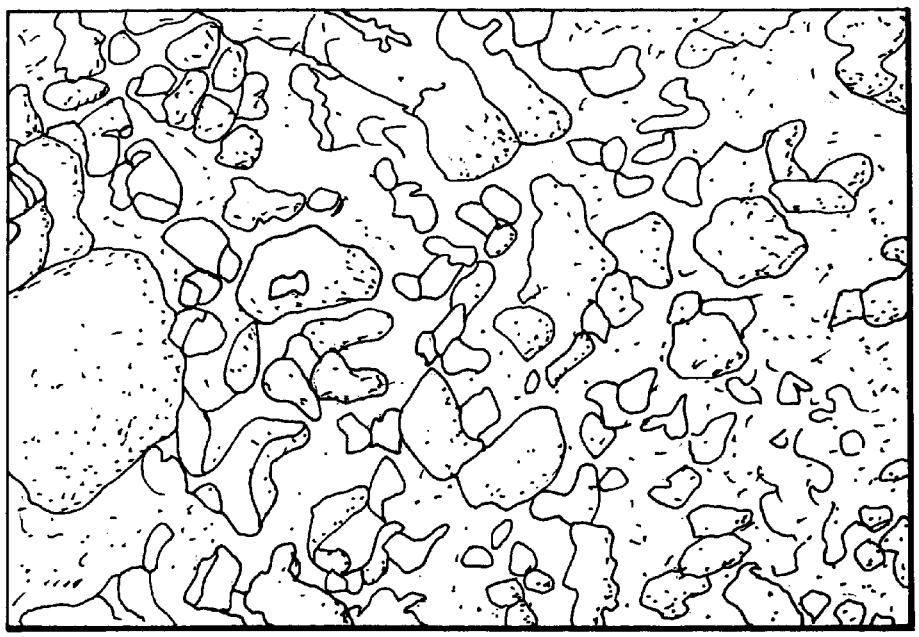

FIG. 6 shows the scanning electron micrographs of carbonation reactivated sorbent samples. Unlike reactivation via hydration, carbonated sorbent samples have a predominantly calcitic $CaCO_3$ structure with dimensions smaller than the parent spent sorbent (Wei et al., 1997). The crystalline structure shown by the carbonation reactivated sorbents is very similar to the structure shown by the high reactivity $CaCO_3$ sorbent (Mahuli et al., 1997; Wei et al., 1997). The EDS analysis is performed on both hydration and carbonation reactivated sorbent samples and the results are given in Table 3. After reactivation, the Ca/S ratio in the vicinity of the surface is significantly higher for carbonated samples than for the hydrated samples when compared with the Ca/S ratio of untreated partially utilized sorbent. Thus, on the basis of microscopy and surface composition analyses, reactivation via carbonation is found to redistribute the available calcium within the sorbent particle more effectively than hydration reactivation, therefore, making the free calcium available for reacting with $SO_2$.

Figure 7:
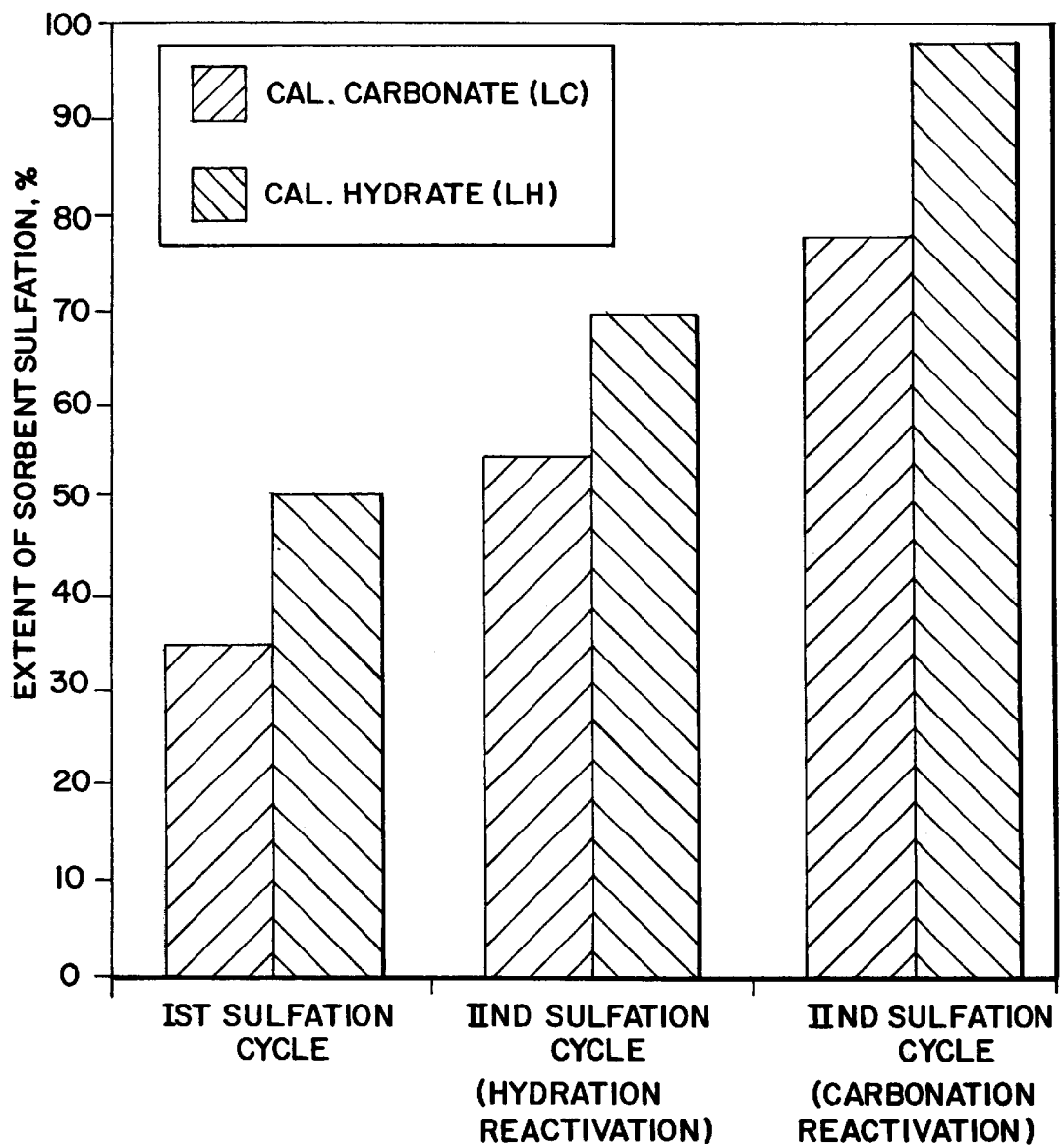
FIG. 7 shows a chart of sorbent utilization after a first cycle and a second cycle of sulfanation, in accordance with one embodiment of the present invention.

The second cycle of sulfation of reactivated sorbents is carried out under experimental conditions described earlier. FIG. 7 shows the results of sulfation of sorbents reactivated via both carbonation and hydration. It can be seen that carbonation reactivated sorbents show an ultimate sorbent utilization of more than 95%, while the hydration reactivated sorbents demonstrates a sorbent utilization of about 70% for partially sulfated calcine from $Ca(OH)_2$. Calcine from $CaCO_3$ shows about 80% and 55% sorbent utilization following second cycle of sulfation after reactivation via carbonation and hydration respectively.

Although not intending to be limited to any theory of the invention, the theoretical basis for the difference in the reactivity of the sorbents reactivated via carbonation and hydration may be postulated on the basis of difference in solubilities for $Ca(OH)_2$ and $CaCO_3$ in water. During hydration, more than the stoichiometric amount of water (water needed for complete hydration of all the unreacted CaO) is added. All the CaO is believed to be converted to $Ca(OH)_2$, as found from the TGA results. As also reported by previous researchers, the reactivation due to hydration occurs due to the formation of high molar volume $Ca(OH)_2$ which generates cracks in the outer non-porous $CaSO_4$ layer. Upon calcination these cracks are further developed and provide access to the unreacted calcium (Shearer et al., 1980; Marquis et al., 1992). Thus, reactivation via hydration exposes the unreacted calcium by generating fissures and "canyons" in the outer CaSO4 layer (otherwise non-porous) but doesn't assure a complete redistribution of available calcium. Moreover, the solubilities of $Ca(OH)_2$ and CaSO4 (1.85 g/lit and 2.9 g/lit, respectively) are such that, in order to dissolve and reconstitute the sorbent for the desired calcium and sulfur redistribution, enormous amounts of water are needed.

For the reactivation of partially utilized sorbent via carbonation a "source and sink" mechanism is proposed which involves formation of $Ca(OH)_2$, as an intermediate, which subsequently gets dissolved in water and acts as an incessant source of $Ca^{+2}$ ions. $CO_2$ which is constantly bubbled through the suspension, may provide the necessary $CO_3^{-2}$ ions which react with $Ca^{+2}$ to form $CaCO_3$. The negligible solubility of $CaCO_3$ ensures that the freshly formed carbonate is precipitated out. Thus, formation of $CaCO_3$ acts a sink for calcium ions and provides the necessary "gradient" for $Ca(OH)_2$ to constantly dissolve in water. In the absence of $CO_2$, $Ca(OH)_2$ in water therefore would reach an equilibrium concentration determined by its solubility, thus preventing any further dissolution of $Ca(OH)_2$. The proposed "source and sink" mechanism allows the reformulation of the sorbent particle structure to "fold inside out" and thus, make the unconverted calcium from the sorbent (free Ca) accessible to $SO_2$. The increased sorbent utilization shown by carbonation reactivation is due to better redistribution of unsulfated calcium.

Reactivation of Fly Ash and Bottom Ash

The petroleum coke ash samples, obtained from Manitowac power generation unit (Foster Wheeler Corp.), were analyzed to give a surface area of 9.7 m2/g for FA and 1.4 m2/g for BA and negligible pore volumes. Approximately 10% of the BA particles are larger than 1 mm. Only a small quantity of ash (less than 25 mg) was used for a given experiment and in order to avoid non-representative sampling, particles larger than 500 mm were discarded.

Figure 8A:
FIG. 8 shows scanning electron micrographs of (a) fly ash, and (b) bottom ash as received from Foster Wheeler Development Corp.
Figure 8B:
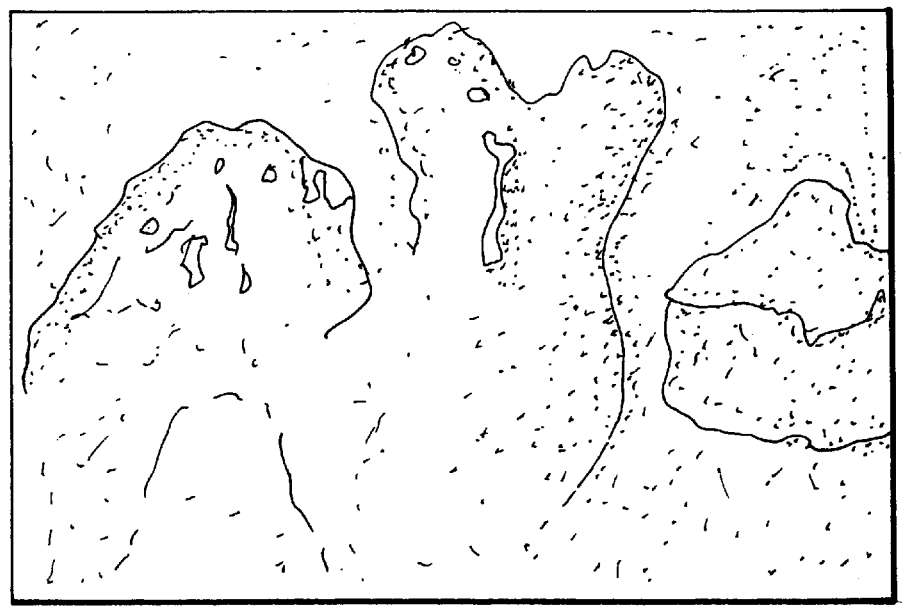

FIGS. 3 shows the particle size distributions of FA and sieved BA, which indicate a d50 of 15 mm for FA and 190 mm for BA. The chemical compositions of the FA and sieved BA are given in Table 2. The free calcium contents of the ash samples were calculated assuming that all sulfur is in the form of calcium sulfate (determined from IC) and all calcium not in the form of hydroxide, carbonate (determined from TGA) or sulfate was free calcium. These assumptions, although not strictly valid, make a very good approximation (Khan et al., 1995). The ion chromatographic (IC) analyses show a sulfation conversion of 38% for FA and 40% for BA. The scanning electron micrographs of FA and BA are shown in FIG. 8. It can be seen from these micrographs that the ash surface has a nonporous molten texture, which is indicative of high levels of sintering. The EDS results show a relatively low Ca/S ratio in the vicinity of the ash surface (Table 3).

Figure 9A:
FIG. 9 shows scanning electron micrographs of hydration reactivated (a) fly ash, and (b) bottom Ash.
Figure 9B:
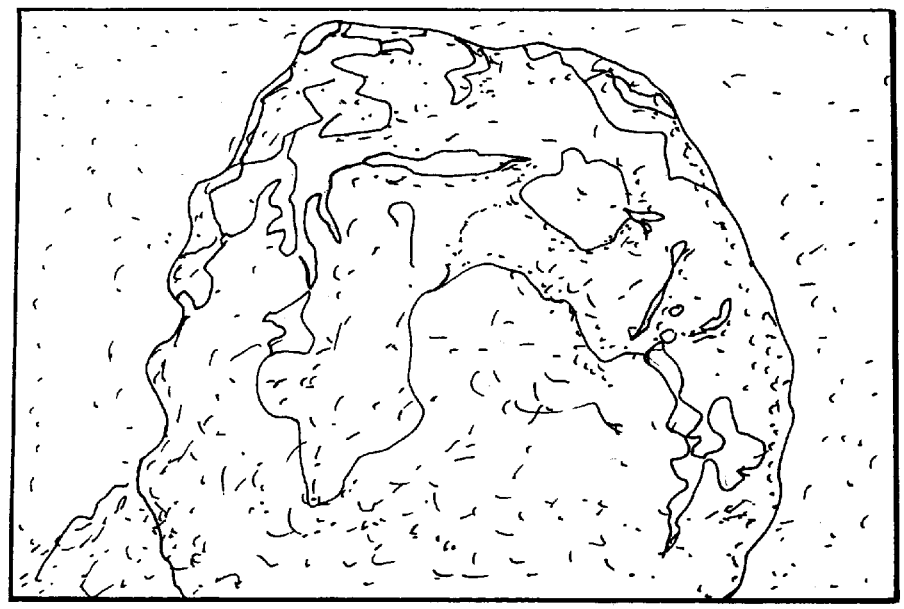
Figure 10A:
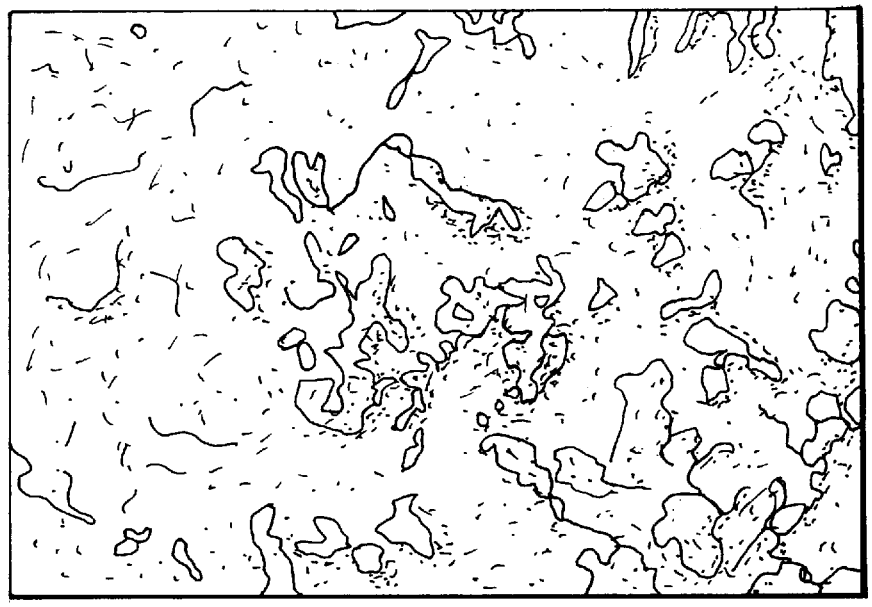
FIG. 10 shows electron micrographs of carbonation reactivated (a) fly ash and (b) bottom ash.
Figure 10B:
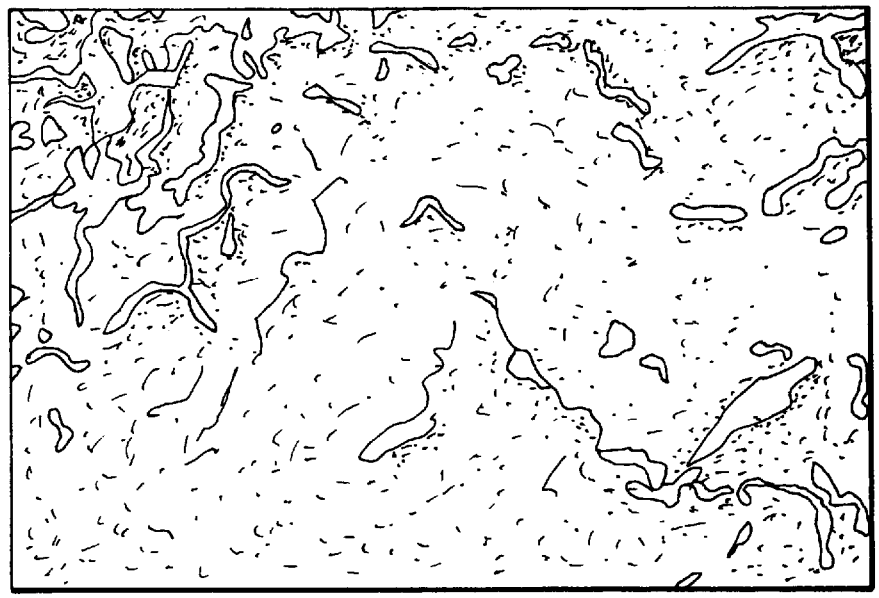

The as-received FA and BA were found to exhibit negligible further $SO_2$ capturability and were concluded to be completely spent or deactivated. These as-received ash samples were reactivated via both carbonation (using $CO_2$) and hydration (using $N_2$) in the slurry bubble column reactor. The scanning electron micrographs of the hydration reactivated ash samples are shown in FIG. 9. It can be seen that, similar to FIG. 5, hydrated spent sorbent/ash samples show development of cracks on the surface due to the formation of high molar volume $Ca(OH)_2$. Scanning electron microscopy was performed on carbonation reactivated samples also and the results are presented in FIG. 10. Carbonation reactivated ash sample show a predominantly calcitic $CaCO_3$ structure, similar to the one shown in FIG. 6. The energy dispersive spectroscopy was performed on samples reactivated by both carbonation and sulfation, these results are summarized in Table 3. After reactivation, the Ca/S ratio in the vicinity of the surface was significantly higher for carbonate reactivated ash samples than for the hydrate reactivated samples. The reactivation via carbonation was found to redistribute the available calcium within the sorbent particle more effectively than hydration. This corroborates well with the findings of reactivation of laboratory generated partially utilized sorbent.

Figure 11:
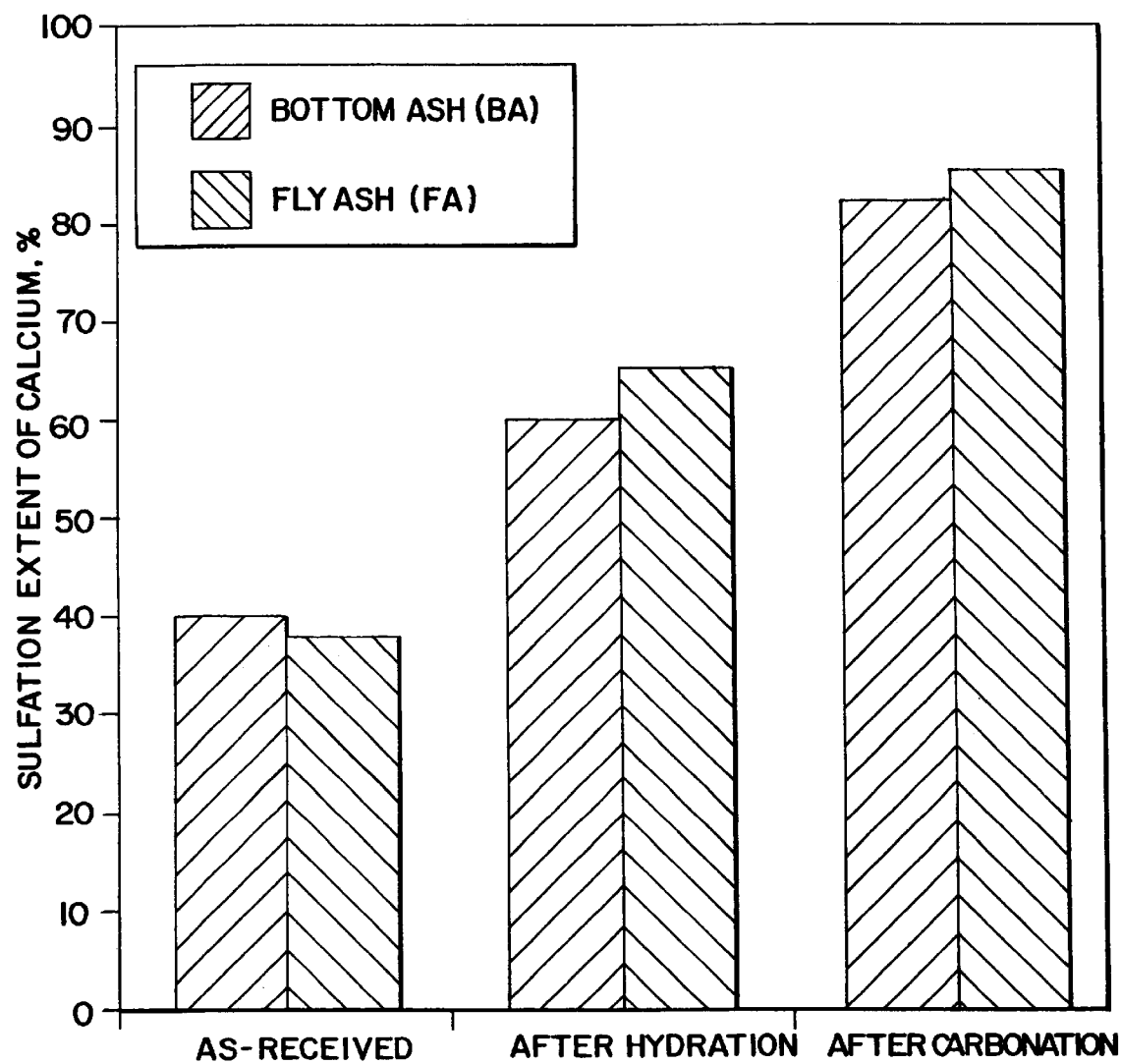
FIG. 11 shows a chart of the extent of sulfanation of available calcium in ash samples following reactivation, in accordance with one embodiment of the present invention.

The reactivated ash samples were subjected to the second cycle of sulfation. The results of second cycle of sulfation following hydration and carbonation reactivations are shown in FIG. 11. Carbonation reactivated ash shows the ultimate sulfation extent of 85% for FA and 82% for BA, while the hydration reactivated sorbent/ash demonstrates a sorbent utilization of only 65% for FA and 60% for BA. The reproducibility of the sulfation results shown by the reactivated ash samples is confirmed by conducting multiple experiments under identical conditions Conclusions Reactivation of the partially utilized calcium-based sorbents via atmospheric carbonation was demonstrated to be a promising process. Carbonation reactivated sorbents and ashes show markedly higher sorbent utilization upon further sulfation. Redistribution and increased exposure of unreacted/available calcium is suggested to be the main reason for heightened sorbent utilization. On the basis of the surface morphology and chemical composition analyses a "source and sink" mechanism for reactivation via carbonation is proposed. The postulated mechanism suggests that the presence of adequate amounts of water hydrates the unreacted CaO to $Ca(OH)_2$ which provides by dissolution a "source" of $Ca^{2+}$ ions for $CaCO_3$ formation in the aqueous phase. The low solubility of $CaCO_3$ leads to its precipitation and acts as a continuous "sink" for $Ca^{2+}$ ions.

Having shown and described a preferred embodiments of the invention, those skilled in the art will realize that many variations and modifications may be made to affect the described invention and still be within the legal and equitable scope of the claimed invention. Thus, many of the features, constituent elements and process steps indicated above may be altered or replaced which will provide the same result and fall within the spirit of the claimed invention. It is the intention, therefore, to limit the invention only as indicated by the legal and equitable scope of the claims, the text of which is incorporated herein.

What is claimed is:

1. A method for reactivating a calcium-based chemical sorbent, said method comprising the steps:

(a) obtaining a calcium-based sorbent said sorbent having an interior portion comprising CaO and an exterior portion having adsorbed thereupon at least one waste stream-derived component; and (b) subjecting said calcium-based sorbent to carbonation in an aqueous solution so as to at least partially reactivate said sorbent by subjecting said interior portion to a carbonation reaction such that said calcium-based sorbent becomes solvated and then redeposits in the form of calcium carbonate on the surface of said adsorbed waste stream-derived component.

2. The method according to claim 1 wherein said carbonation is carried out in the presence of a substance selected from the group consisting of surfactants, modifiers and dispersants.

3. The method according to claim 2 wherein said substance is a modifier selected from the group consisting of sodium chloride, calcium chloride and sodium carbonate.

4. The method according to claim 2 wherein said substance is a surfactant, and wherein said surfactant is calcium lignosulfate.

5. The method according to claim 1 wherein said calcium-based sorbent is selected from the group consisting of calcium carbonate sorbents and calcium hydrate sorbents.

6. The method according to claim 1 wherein said carbonation is carried out in a bubbling reactor.

7. A method according to claim 1 wherein the concentration of carbonation in said aqueous solution is in the range of from about 2 to about 16 percent.

8. The method according to claim 1 wherein said waste stream-derived comprises calcium sulfate.

9. A reactivated calcium-based sorbent prepared in accordance with the method of claim 1.

10. A reactivated calcium-based sorbent prepared in accordance with the method of claim 2.

11. A reactivated calcium-based sorbent prepared in accordance with the method of claim 3.

12. A reactivated calcium-based sorbent prepared in accordance with the method of claim 4.

13. A reactivated calcium-based sorbent prepared in accordance with the method of claim 5.

14. A reactivated calcium-based sorbent prepared in accordance with the method of claim 6.

15. A reactivated calcium-based sorbent prepared in accordance with the method of claim 7.

16. A reactivated calcium-based sorbent prepared in accordance with the method of claim 8.

17. A reactivated calcium-based chemical sorbent, said reactivated chemical sorbent arising from a partially used chemical sorbent having a waste stream derived component adsorbed thereupon, said reactivated sorbent comprising particles comprising:

(a) an interior portion comprising said waste stream component originally adsorbed on to said partially used sorbent;

(b) an exterior portion comprising a calcium-based chemical sorbent material, said exterior portion having been subjected to a carbonation reaction such that said calcium sorbent becomes solvated and then redeposits in the form of calcium carbonate on the surface of said adsorbed waste stream-derived component.

18. A reactivated chemical sorbent according to claim 17, wherein said calcium-based chemical sorbent material is selected from the group consisting of calcium carbonate and calcium hydrate.

19. A reactivated chemical sorbent according to claim 17, wherein said waste stream derived component comprises calcium sulfate.

* * * * *

UNITED STATES PATENT AND TRADEMARK OFFICE
CERTIFICATE OF CORRECTION

PATENT NO. : 6,309,996 B1
DATED : October 30, 2001
INVENTOR(S) : Liang Shih Fan et al.

It is certified that error appears in the above-identified patent and that said Letters Patent is hereby corrected as shown below:

<u>Column 6,</u>
Line 21, please delete "$(N_2/C)_2)$" and replace it with -- $(N_2/CO_2)$ --.

Signed and Sealed this

Twenty-eighth Day of May, 2002

*Attest:*

JAMES E. ROGAN
*Attesting Officer*     *Director of the United States Patent and Trademark Office*